June 4, 1963

A. ONYSKIN 3,091,951

SLIP CLUTCH

Filed June 16, 1961

INVENTOR
ALEXANDER ONYSKIN
BY
Raymond R. Skolnick
AGENT.

United States Patent Office 3,091,951
Patented June 4, 1963

3,091,951
SLIP CLUTCH
Alexander Onyskin, 56 Anoatok Ave., Huntington, N.Y.
Filed June 16, 1961, Ser. No. 117,595
1 Claim. (Cl. 64—30)

This invention relates in general to clutch mechanisms and more particularly to miniature slip type clutch mechanisms.

Heretofore, slip type clutches have resorted to the use of a high friction material between two shafts which are coaxially aligned. The pressure exerted upon the friction material determines the amount of force which can be transmitted through the two shafts. Whenever the force which is exerted upon the shafts becomes greater than the resistivity of the high friction material the shafts slip in relation to each other. The slippage of the shafts relative to each other is a very desirable feature since a slip clutch when placed in a gear train or other geared instrument protects the gearing train or other delicate instrument from mechanical overloads and sudden shocks.

Additionally, slip clutches have been built into the equipment they are to protect and have not been built as plug in or self-contained units. The repair or change of torque in this equipment meant extensive and expensive repairs.

Since the gear train or instrument has to be capable of transmitting a given amount of torque it is very important that the slip clutch used does not slip at a lesser amount of torque or at a greater amount of torque. If it slips at a lesser amount of torque then the gear train or instrument cannot perform according to its designed characteristics. If the slip clutch slips at a greater amount of torque then the gear train or instrument may become damaged.

It is therefore an object of the invention to provide improved means for allowing slippage between two shafts whenever a specific torque is exceeded between the two shafts.

Another object of the invention is to provide a miniature slip clutch of extreme accuracy.

A further object of the invention is to provide a slip clutch mechanism which is self-contained in its own housing and which can be inserted into and out of a gear train.

A still further object of the invention is to provide a slip clutch mechanism which is small, compact, endurable and economical of manufacture.

To these ends the invention contemplates the use of two shafts which are coaxially aligned within a housing. Where it is desired to have the shafts extending from the same side of the housing then one shaft is concentrically mounted within the other shaft. Between the two shafts is a saucer shaped spring. The spring can be solid or have radial extending fingers. The spring force is adjusted by the use of shims. The greater the spring force the higher the break away torque. Conversely, the lesser the spring force the lesser the break away torque.

The invention has other objects and advantages which will appear from the following description of a particular embodiment of the invention in conjunction with the accompanying drawing, in which.

Figure 1:
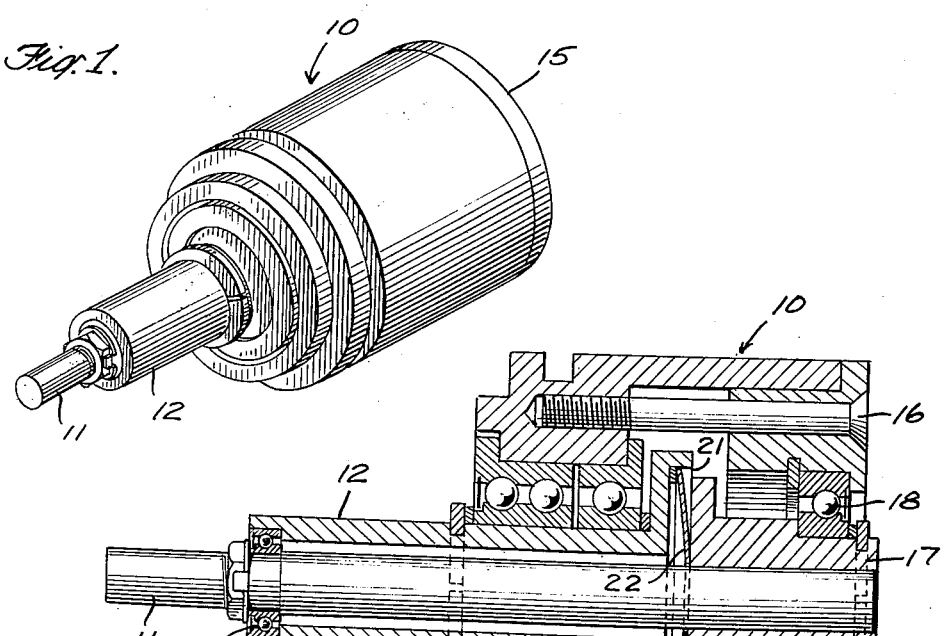
FIGURE 1 shows an outside view of a particular embodiment of the invention where the shafts extend from the same side of the housing.

With reference to the drawing FIGURE 1 shows a cylindrical case 10 having two shafts 11 and 12 extending from one side thereof.

Figure 2:
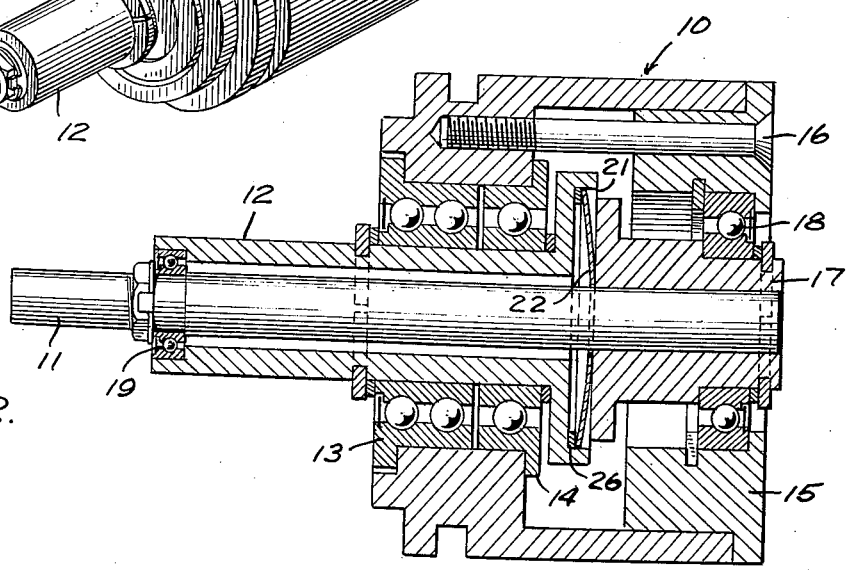
FIGURE 2 shows a longitudinal cross sectional view of the embodiment of the invention shown in FIGURE 1.

Referring to FIG. 2 it is seen that the shaft 12 is hollow and that it is rotatably mounted within the front end of case 10 by means of flanged bearings 13 and 14 which are mounted back to back. At the rear of case 10 is a retaining plate 15 which is attached to the cylindrical case 10 by means of screws 16, only one of which is shown. The retaining plate 15 rotatably supports a collar 17 by means of a bearing 18. The shaft 11 is rotatably supported at its front end by means of a bearing 19 which is mounted within the front end of shaft 12. The rear end of shaft 11 is supported by the collar 17, the shaft 11 being rigidly secured thereto by either being press fitted into the collar or by being staked in.

The rear end of shaft 12 is flange shaped with an annular recess 21 therein. Between the collar 17 and the rear end of shaft 12 is a saucer shaped spring 22, the spring 22 being held from radially expanding by the annular recess 21.

Figure 3:
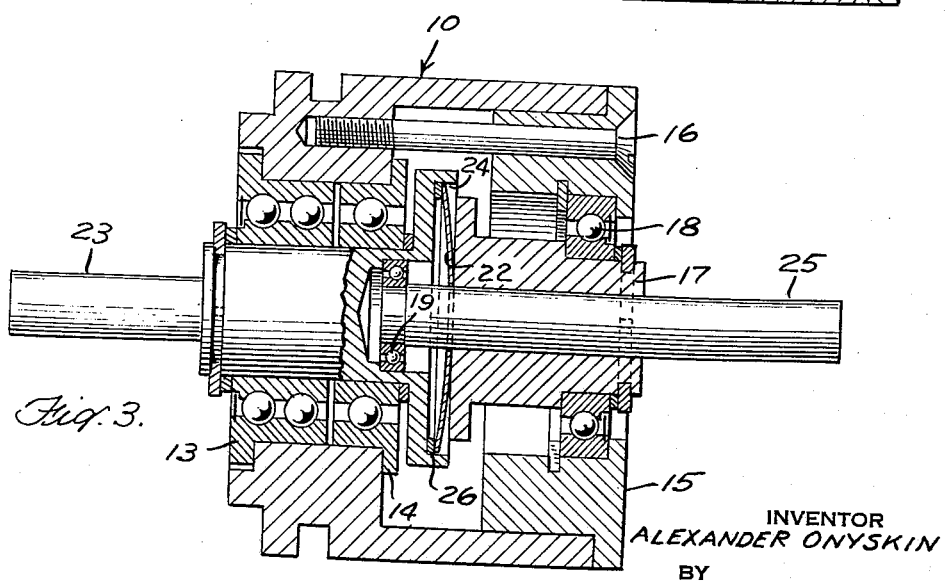
FIGURE 3 is a longitudinal cross sectional view of an alternate embodiment of the invention showing the shafts extending from opposite sides of the housing.

Referring to FIG. 3 the particular embodiment shown there of the invention is similar to the embodiment shown in FIG. 2 except that the shafts instead of extending from the same side of the cylindrical case extend one from each side. In describing FIG. 3 the numerals used in describing FIG. 2 will be used whenever the parts remain identical. It is seen in FIG. 3 that a shaft 23 extends from the front side of the cylindrical case 10. The shaft 23 is stepped and its rear end is flange shaped with an annular recess 24 therein. The shaft 23 is rotatably supported within the front end of the cylindrical case 10 by means of flanged bearings 13 and 15 which are mounted back to back. At the rear of case 10 is a retainer plate 15 which is held to the case 10 by means of screws 16, only one of which is shown in FIG. 3. A collar 17 is rotatably mounted within the retainer plate 15 by means of bearing 18.

A shaft 25, which extends from the rear of the cylindrical case 10 is supported at its front end by means of a bearing 19, the bearing 19 being mounted at the rear of shaft 23. The central portion of shaft 25 is rigidly secured to the collar 17 so that it rotates therewith, the shaft 25 being either press fitted or staked into the collar 17. Mounted between the collar 17 and the shaft 23 is a saucer shaped spring 22 which is held from radially expanding by means of the annular recess 24.

The spring force exerted by the spring 22 is adjusted at assembly by the thickness of a shim 26. The thicker the shim the greater the spring force. This adjustment is similar to the preloading of a tension or compression spring.

The operation of the slip clutch will now be explained more fully. Whenever it is desired to have a gear train or instrument protected from overloads or sudden shocks the slip clutch is employed. Whether the single ended or double ended slip clutch is used depends upon the design considerations of the gear train being protected.

Assuming the single ended slip clutch is used then the gear train is split and the end gear of the split gear train is affixed to the shaft 11. A similar gear to the end gear is then affixed to shaft 12 and then meshed with the first gear of the other part of the split gear train. With the gear train in operation the torque being transmitted remains the same as if the slip clutch were not in the gear train as long as sudden shocks or overloads are not encountered by the gear train. This is accomplished by the shaft 11 turning collar 17 which in turn rotates shaft 12 through the spring 22. Should a sudden shock or load occur then collar 17 will not turn shaft 12 as the spring force, set into the spring 22, will not be great enough to overcome this sudden shock or load. The spring force of the spring 22 is preset at assembly and can be designed so that shafts 11 and 12 slip relative to each other at calculated torque requirements.

The operation of the double ended slip clutch is similar to the operation of the single ended slip clutch and needs no further explanation as to its operation.

Although I have described particular embodiments of the invention, it is understood that the present disclosure has been made by way of example and that numerous changes in the details of construction and the combination and arrangement of parts may be resorted to without departing from the spirit and the scope of the invention as hereinafter claimed.

What is claimed is:

A slip clutch comprising, a housing, a pair of flanged bearings mounted within the front end of said housing, a hollow shaft rotatably mounted within said flanged bearings so as to allow said hollow shaft to extend from the front end of said housing, a flange secured to the rear of said hollow shaft, said flange having an annular recess therein, an annular shim mounted within said annular recess, a third bearing mounted within the rear end of said housing, a collar rotatably mounted within said third bearing, a fourth bearing mounted within the front end of said hollow shaft, a second shaft rotatably mounted within said fourth bearing and rigidly secured to said collar whereby said second shaft extends from the front end of said housing and extends beyond said hollow shaft and a saucer shaped spring mounted about said second shaft within said annular recess, said spring being preloaded by said annular shim.

References Cited in the file of this patent

UNITED STATES PATENTS

| | | |
|---|---|---|
| 1,827,039 | Ragan | Oct. 13, 1931 |
| 1,980,185 | Chilton | Nov. 13, 1934 |
| 2,241,689 | Whittaker | May 13, 1941 |
| 2,288,849 | Schwitzer | July 7, 1942 |
| 2,436,418 | Bradford | Feb. 24, 1948 |
| 2,660,281 | Ochtman | Nov. 24, 1953 |
| 2,729,079 | Kuehn | Jan. 3, 1956 |
| 2,952,146 | Bruck | Sept. 13, 1960 |